United States Patent Office 2,993,891
Patented July 25, 1961

2,993,891
BUTYROLACTONE DERIVATIVES (III)
Hans Willi Zimmer, Cincinnati, Ohio, and James M. Holbert, Lookout Mountain, Tenn., assignors to The Chattanooga Medicine Company, Chattanooga, Tenn., a corporation of Tennessee
No Drawing. Filed July 14, 1958, Ser. No. 748,131
1 Claim. (Cl. 260—240)

The instant invention relates to novel organic compounds and a novel method of preparing the same, and more particularly, to novel butyrolactone derivatives and their preparation.

Although the compounds of the invention may have a number of uses in various fields they are particularly useful as pharmaceutical compounds and/or chemical intermediates in the synthesis of pharmaceutical compounds. The compounds of the invention may function as a uterine depressant and anti-spasmodic for smooth muscle.

In addition, the compounds of the invention may display antibacterial activity comparable to that of the well known sulfa drugs, sulfanilamide and sulfadiazine. In this respect, it should be noted that certain bacteria such as *Streptococcus pyogenes*, *Micrococcus pyogenes*, and *Escherchia coli* tend to become resistant to the known sulfa drugs, although they may be particularly sensitive to a new sulfa compound. It is believed that exposure of such bacteria to known sulfa drugs often tends to result in the survival of a strain resistant to such drugs, but still sensitive to a new drug to which the strain has not yet been exposed. There is thus a great need for new compounds which display antibacterial activity.

It is, therefore, an important object of the instant invention to provide new and useful butyrolactone derivatives.

It is another object of the instant invention to provide novel methods of producing such butyrolactone derivatives.

Other and further objects, features and advantages of the present invention will become apparent to those skilled in the art from the following detailed disclosure thereof.

The instant invention consists in a compound having the formula:

AXR wherein X is a $C_1-C_4$ hydrocarbon group, A is selected from the group consisting of

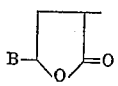

and

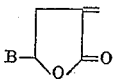

and R is a radical containing a benzene nucleus, any radicals attached thereto being selected from the class consisting of —D, —$NO_2$, —NHD, —$ND_2$, —COD, benzyl, halo and —OY, wherein each D is a $C_1-C_4$ alkyl radical, and Y is selected from the group consisting of —H, —COD, —D, benzyl, and —$(CH_2)_nND_2$, wherein $n$ is an integer from 1 to 3; there being at least one —OY substituent on said benzene nucleus; and the invention also consists in a method of preparing such compound.

In general, the compounds of the invention are alpha substituted gamma-butyrolactones. The gamma-butyrolactone ring has the following formulae:

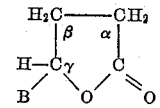

or

wherein B is H or $CH_3$. Strictly speaking the compound is gamma-valerolactone when B is $CH_3$, but this compound is also gamma-(methyl)-gamma-butyrolactone. The compounds of the invention are substituted at the alpha position on the butyrolactone ring.

The compounds of the instant invention are alpha substituted butyrolactones wherein the alpha substituent comprises a benzene ring connected to the butyrolactone ring by an aliphatic chain and certain substituents which include at least one —OY group.

Certain alpha substituted butyrolactones, and their methods of preparation, are known. For example, Losanitsch (Monatsh., 35, 311, 1914) discloses alpha-(benzal)-gamma-valerolactone:

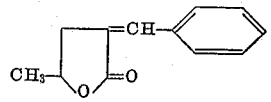

German Patent No. 844,292 of 1944 discloses alpha-(benzal)-gamma-butyrolactone:

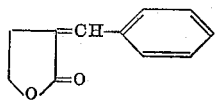

which is now a commercially available compound. The German patent discloses the condensation of butyrolactone with benzaldehyde to produce the above compound and further discloses the hydrogenation thereof to produce alpha-(benzyl)-gamma-butyrolactone:

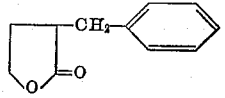

It has been found that the condensation reaction of said German patent is not operative with a number of substituted benzaldehydes. We have found, however, that the condensation of butyrolactone can be carried out successfully with benzaldehydes containing the —OY substituent on the benzene nucleus. The resulting products may be hydrogenated at the alpha-exo double bond.

In general, the condensation reaction is carried out by reacting 0.1 mol of the aldehyde with 0.2 mol of butyrolactone dissolved in 50–200 ml. of a solvent such as benzene. With stirring, 0.15 mol of sodium methylate is added gradually and the stirring is continued for a short time thereafter under cooled reaction conditions. The initial reaction is carried out in an ice-salt bath and, in the case of liquid aldehydes being easily oxidized, the reaction is carried out under an atmosphere of dry nitrogen. Ordinarily, the reaction is completed by heating the reaction mixture briefly at 60–65° C. in a water bath. The reaction mixture is then decomposed with 10% aqueous sulfuric acid and stirring is continued for about one hour to effect relactonization. Ordinarily, the product precipitates and can be filtered off. In other instances, the sulfuric acid layer in the filtrate is separated, and the benzene layer is washed with dilute sodium bicarbonate solution, then water, and the benzene is then distilled off from this portion of the filtrate and the residue may be recrystallized for purification.

Hydrogenation of the alpha-exo double bond is carried out by dissolving or suspending 2 to 20 grams of the condensation product in about 250 ml. of methanol, adding 5 to 10% of the weight of the condensation product of platinum dioxide, and shaking under 45–50 pounds of hydrogen in a Parr apparatus until the pressure remains constant. After 15 minutes to 24 hours (depending upon the amount of starting material used), the pressure remains constant. The catalyst is removed by filtration and the solvent distilled off to obtain a residue which may be purified by recrystallization.

*Example 1*

The apparatus used consists of a 500 milliliter three neck flask fitted with a stirrer, reflux condenser, thermometer and nitrogen inlet tube. A charge of 0.1 mol of salicylaldehyde and 0.2 mol of butyrolactone is dissolved in 100 ml. of benzene and, with stirring, cooled down to 3° C. by means of an ice-salt bath. A nitrogen atmosphere is maintained over the mixture. Over a period of 15 minutes, 0.25 mol of sodium methylate is added incrementally. The temperature rises to about 27° C. and the mixture becomes a brownish jelly which is diluted with an additional 100 ml. of benzene. Stirring is then continued for 3 hours at this relatively low temperature, followed by heating on a water bath for 45 minutes at 60–65° C. After standing overnight, sufficient aqueous 10% sulfuric acid is added with stirring to make the reaction mixture acidic. Stirring is continued for an hour and the precipitate which has formed is filtered on a suction filter and washed thoroughly with water to yield 12 grams (63%) of a product having a melting point of 184—185° C. After three recrystallizations from methanol it is found that the white crystalline product has the same melting point. The filtrate is separated and the benzene layer is washed with dilute sodium bicarbonate solution, then with water and then distilled to yield a brown oil, which upon further distillation is identified as 4.0 grams of salicylaldehyde. Elemental analysis for alpha - (o-hydroxybenzal)-butyrolactone: calculated for $C_{11}H_{10}O_3$ is C=69.46, H=5.30; and C=69.44, H=5.51.

A charge of 5 grams of alpha - (o-hydroxybenzal)-butyrolactone is added to 250 milliliters of methanol, to which is also added 0.5 gram of platinum dioxide, in a Parr apparatus, which is shaken under 45–50 pounds of hydrogen until the pressure remains constant. The catalyst is then removed by filtration, and the solvent distilled off. The product may be recrystallized. The instant product is alpha-(o-hydroxybenzyl)-butyrolactone which is a clear oily liquid boiling at 174–175° C. at 5 mm. of Hg. Elemental analysis for the instant product: calculated for $C_{11}H_{12}O_3$ is C=68.73, H=6.29; and found: C=68.12, H=6.20.

*Example 2*

A procedure is carried out that is the same as that of Example 1, except that the aldehyde used is p-hydroxybenzaldehyde, the reaction time before heating in the water bath is 15 instead of 3 hours, and the reaction mixture is heated in the water bath at 60–65° C. for 1 hour, and the resulting product is alpha-(p-hydroxybenzal)-butyrolactone which is recrystallized from water to yield a yellow crystalline product melting at 181–182° C. Elemental analysis for this product: calculated for $C_{11}H_{10}O_3$ is C=69.46, H=5.30; and found: C=69.05, H=5.38.

The hydrogenation procedure of Example 1 is also carried out using alpha-(p-hydroxybenzal)-butyrolactone to obtain the product: alpha-(p-hydroxybenzyl)-butyrolactone, which is a clear oily liquid melting at 187–190° C. at 4 mm. Hg. Elemental analysis for alpha-(o-hydroxybenzyl)-butyrolactone: calculated for $C_{11}H_{12}O_3$ is C=68.73, H=6.29; and found: C=67.27, H=6.76.

*Example 3*

A procedure is carried out that is the same as that of Example 1, except that the aldehyde used is o-ethoxybenzaldehyde and the reaction time at low temperature is only 2½ hours, and the resulting product is alpha-(o-ethoxybenzal)-butyrolactone which is recrystallized from methanol to yield white crystals melting at 105–105.5° C. Elemental analysis for alpha-(o-ethoxybenzal)-butyrolactone: calculated for $C_{13}H_{14}O_3$ is C=71.54, H=6.47; and found: C=71.45, H=6.45.

The foregoing compound may be hydrogenated at the alpha-exo double bond in the manner described in the previous examples to yield alpha - (o-ethoxybenzyl)-butyrolactone. In addition, the gamma-valerolactone derivative may be prepared by substituting gamma-valerolactone for the butyrolactone starting material and the resulting product is alpha-(o-ethoxybenzal)-gamma-valerolactone.

*Example 4*

A procedure is carried out that is the same as that of Example 1, except that the aldehyde used is 3,4-diethoxybenzaldehyde and the reaction is carried out at low temperautres for 4½ hours and then heated in a water bath for ½ hour. The resulting product: alpha-(3,4-diethoxybenzal)-butyrolactone is recrystallized from methanol to yield a white crystalline material melting at 116° C. Elemental analysis for this product: calculated for $C_{15}H_{18}O_4$ is C=68.68, H=6.92; and found: C=68.85, H=7.09.

The corresponding gamma-valerolactone derivative is prepared by substituting gamma-valerolactone for butyrolactone as a starting material. Hydrogenation at the alpha-exo double bond of these compounds is carried out using the procedure described in Example 1.

*Example 5*

A procedure is carried out that is the same as that of Example 1, except that the aldehyde used is 3,4,5-trimethoxybenzaldehyde, the reaction is carried out at low temperature for only 1 hour and in the water bath at 60–65° C. for ½ hour, and the resulting product is alpha-(3,4,5-trimethoxybenzal)-butyrolactone in the form of white crystals melting at 152–152.5° C. Elemental analysis for this product: calculated for $C_{14}H_{16}O_5$ is C=63.63, H=6.10; and found: C=63.59, H=6.10.

The hydrogenation procedure of Example 1 is also carried out using the aforementioned product to obtain alpha-(3,4,5-trimethoxybenzyl)-butyrolactone which is a white amorphous material melting at 72° C. and boiling at 209–210° C. at 5 mm. Hg. Elemental analysis for alpha - (3,4,5 - trimethoxybenzyl) - butyrolactone: calculated for $C_{14}H_{18}O_5$ is C=63.14, H=6.82; and found: C=62.86, H=6.97.

*Example 6*

A procedure is carried out that is the same as that of Example 5, except that the aldehyde used is p-benzyloxybenzaldehyde and the resulting product is crystallized from acetic acid to obtain pale yellow crystals melting at 166–166.5° C. Elemental analysis for alpha-(p-benzyloxybenzal)-butyrolactone: calculated for $C_{18}H_{16}O_3$ is C=77.12, H=5.75; and found: C=76.60, H=6.04. This compound exhibits a uterine sedative action of about ⅒ that of papaverine. The corresponding alpha-(p-hydroxybenzal)-butyrolactone may be prepared by hydrolyzing the instant product. For example, a charge of 0.1 mol of alpha-(p-benzyloxybenzal)-butyrolactone is refluxed for 1½ hours with 100 ml. of concentrated hydrochloric acid and 250 ml. of glacial acetic acid and, after standing overnight, the solvents are distilled off and the residue is recrystallized from methanol and water.

Example 7

A procedure is carried out that is the same as that of Example 1, except that the aldehyde used is anisaldehyde, the reaction is carried out at low temperature for 2 hours, and the reaction mixture is then heated in the water bath at 60–65° C. for 1 hour; and the resulting alpha-(p-methoxybenzal)-butyrolactone is recovered after recrystallization from ethanol in the form of white crystals melting at 126–127° C. Elemental analysis for this product: calculated for $C_{12}H_{12}O_3$ is C=70.57, H=5.92; and found: C=70.35, H=5.95. This compound exhibits a uterine sedative action of about 1/10 that of papaverine.

The hydrogenation procedure of Example 1 was carried out using alpha-(p-methoxybenzal)-butyrolactone as the starting material and the resulting product: alpha-(p-methoxybenzyl)-butyrolactone is obtained in the form of white crystals melting at 44° C. Elemental analysis for alpha-(p-methoxybenzyl)-butyrolactone: calculated for $C_{12}H_{14}O_3$ is C=69.88, H=6.84; and found: C=69.98, H=6.86. This compound exhibits a uterine sedative action of about 1/10 that of papaverine.

Example 8

A procedure is carried out that is the same as that of Example 1, except that the aldehyde used is m-hydroxybenzaldehyde, the reaction is carried at low temperatures for 4.5 hours and then in the hot water bath for 1 hour at 60–65° C. The resulting product is crystallized from methanol to yield alpha-(m-hydroxybenzal)-butyrolactone in the form of white crystals melting at 196–197° C. Elemental analysis: calculated for $C_{11}H_{10}O_3$ is C=69.46, H=5.30; and found: C=69.55, H=5.33. This compound exhibits a uterine sedative action of about 1/10 that of papaverine and it also exhibits very strong antibacterial activity with respect to *Streptococcus pyogenes*.

The hydrogenation procedure of Example 1 is carried out using as the starting material alpha-(m-hydroxybenzal)-butyrolactone and the resulting product: alpha-(m-hydroxybenzyl)-butyrolactone is obtained in the form of a white amorphous material melting at 120–121° C. and boiling at 190–192° C. at 5 mm. Hg. Elemental analysis for this compound: calculated for $C_{11}H_{12}O_3$ is C=68.73, H=6.29; and found: C=68.74, H=6.51. This compound exhibits very strong antibacterial activity with respect to *Micrococcus pyogenes*.

Example 9

A procedure is carried out that is the same as that of Example 1, except that the aldehyde used is veratraldehyde and after a short reaction period at low temperatures the reaction mixture is maintained in a water bath at 60–65° C. for ½ hour. The resulting product, recrystallized from methanol, is alpha-(3,4-dimethoxybenzal)-butyrolactone in the form of white crystals melting at 116–116.5° C. Elemental analysis for this compound: calculated for $C_{13}H_{14}O_4$ is C=66.66, H=6.02; and found: C=66.81, H=6.16.

The hydrogenation procedure of Example 1 is carried out using the aforementioned compound as the starting material and the resulting product is alpha-(3,4-dimethoxybenzyl)-butyrolactone in the form of white crystals melting at 105.5–106.5° C. Elemental analysis for this compound: calculated for $C_{13}H_{16}O_4$ is C=66.08, H=6.83; and found: C=66.13, H=6.94. This compound exhibits a uterine sedative action of about 1/5 that of papaverine.

Example 10

A procedure is carried out that is the same as that of Example 1, except that the aldehyde used is vanillin, the reaction is carried out at low temperatures for 4 hours and then heated in a water bath for 1 hour, the resulting product is a cream colored amorphous material melting at 153.5–154° C. Elemental analysis for the alpha-(3-methoxy-4-hydroxybenzal)-butyrolactone: calculated for $C_{12}H_{12}O_4$ is C=65.45, H=5.49; and found: C=65.20, H=5.45. This compound exhibits a uterine sedative action of about 1/10 that of papaverine and it exhibits strong antibacterial activity with respect to *Micrococcus pyogenes*.

The compound is used in the hydrogenation procedure of Example 1, and the resulting product is alpha-(3-methoxy-4-hydroxybenzyl)-butyrolactone in the form of a light yellow pasty amorphous material boiling at 183–184° C. at 4 mm. Hg. Elemental analysis for alpha-(3-methoxy-4-hydroxybenzyl)-butyrolactone: calculated for $C_{12}H_{14}O_4$ is C=64.85, H=6.35; and found: C=64.26, H=6.43. This compound exhibits unusual antibacterial activity with respect to *Streptococcus pyogenes*.

Example 11

A procedure is carried out that is the same as that of Example 1, except that the aldehyde used is p-sec.-butoxybenzaldehyde, the low temperature reaction is carried out for 2 hours and the reaction mixture is then heated in the water bath for ½ hour, and the resulting product, recrystallized from methanol, is alpha-(p-sec.-butoxybenzal)-butyrolactone in the form of a white amorphous material melting at 54–55.5° C. Elemental analysis for this compound: calculated for $C_{15}H_{16}O_3$ is C=73.75, H=6.60; and found: C=73.42. This compound exhibits a uterine sedative action of 1/5 that of papaverine.

As in the case of each of the previously mentioned compounds in the examples, gamma-valerolactone can be substituted for the butyrolactone to obtain the corresponding products. In this case, the product is alpha-(p-sec.-butoxybenzal)-gamma-valerolactone.

Example 12

A procedure is carried out that is the same as that of Example 1, except that the aldehyde used is p-isopropoxybenzaldehyde, the low temperature reaction time is 1 hour and the reaction mixture is heated in a water bath at 60–65° C. for 2½ hours; and the resulting product is alpha-(p-isopropoxybenzal)-butyrolactone in the form of a white crystalline material melting at 115–115.5 C. Elemental analysis for this compound: calculated for $C_{14}H_{16}O_3$ is C=72.39, H=6.94; and found: C=72.26; H=7.05. This compound exhibits a uterine sedative action of about 1/5 that of papaverine.

Example 13

A procedure is carried out that is the same as that of Example 1, except that the aldehyde used is 3-methoxy-4-benzyloxybenzaldehyde, the reaction is carried out at low temperatures for 1½ hours and then the reaction mixture is heated in the water bath for 1 hour and the resulting product, recrystallized from dioxane, is alpha-(3-methoxy-4-benzyloxybenzal)-butyrolactone in the form of pale yellow crystals melting at 151–152° C. Elemental analysis for this compound: calculated for $C_{19}H_{18}O_4$ is C=73.53, H=5.85; and found: C=73.23; H=5.98. This compound exhibits a uterine sedative action of about 1/5 that of papaverine.

The aforementioned compound is hydrogenated using the procedure of Example 1 to obtain alpha-(3-methoxy-4-benzyloxybenzyl)-butyrolactone which is a light yellow oil boiling at 232° C. at 4 mm. Hg. Elemental analysis for this compound: calculated for $C_{19}H_{20}O_4$ is C=73.06, H=6.45; and found: H=6.51. This compound exhibits a uterine sedative action of about 1/5 that of papaverine and it also exhibits strong antibacterial activity with respect to *Micrococcus pyogenes*.

It is important to note that the aforementioned "benzyloxy" derivative of vanillin reacts with the butyrolactone to give a very high yield of as much as 74% and this compound may be readily hydrolyzed in high yields, using the procedure of Example 6, to yield the corresponding vanillin derivative. In contrast, the procedure of Example 10 herein yields the vanillin derivative in a relatively small yield of about 6%. An important aspect of the instant invention is thus a method of preparing a compound having the formula:

AXR wherein X is a $C_1$–$C_4$ hydrocarbon group, A is selected from the group consisting of

and

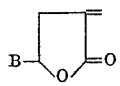

and R is a radical containing a benzene nucleus with a hydroxy group attached thereto, which comprises condensing a compound having the formula:

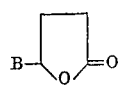

with an aldehyde having the formula:

OX′R′ wherein OX′— is an aliphatic aldehyde group and R′ is a radical containing a benzene nucleus with a benzyloxy group attached thereto, and then hydrolyzing the benzyloxy group in the product to obtain a hydroxy group.

It will be appreciated that once the desired "hydroxy" butyrolactone derivative is obtained, any of the other compounds of the instant invention may be prepared by making substitutions at the hydroxy group. The hydroxy group in the original benzaldehyde reactant, however, has a tendency to interfere with the condensation reaction with the butyrolactone so as to obtain poor yields. The method concept of the instant invention thus provides an improved procedure for obtaining high yields of the compounds of the invention.

*Example 14*

The acetoxy derivative of a hydroxy compound of the invention is prepared by heating a charge of 1 gram of alpha-(o-hydroxybenzal)-butyrolactone, 2 ml. of acetic anhydride and 2 drops of concentrated sulfuric acid for 30 minutes in a boiling water bath. The resulting reaction mixture is then poured into 50 ml. of water; and an oil precipitates and then solidifies after a few seconds. The crude material, after 3 recrystallizations from methanol, is in the form of a white crystalline material melting at 122–123° C. Elemental analysis for alpha-(o-acetoxybenzal)-butyrolactone: calculated for $C_{13}H_{12}O_4$ is H=5.21; and found: H=5.34.

*Example 15*

A procedure is carried out that is the same as that of Example 14, except that the starting material used is alpha-(m-hydroxybenzal)-butyrolactone and the resulting product is alpha-(m-acetoxybenzal)-butyrolactone in the form of white crystals melting at 108.5–110° C. Elemental analysis for this compound: calculated for $C_{13}H_{12}O_4$ is C=67.23, H=5.21; and C=67.08, H=5.41. This compound exhibits a uterine sedative action of about 1/10 that of papaverine.

*Example 16*

A procedure is carried out that is the same as that of Example 14, except that the starting material is alpha-(p-hydroxybenzal)-butyrolactone and the resulting product is alpha-(p-acetoxybenzal)-butyrolactone in the form of a white crystalline material melting at 114° C. This compound exhibits a uterine sedative action of about 1/10 that of papaverine.

We have further found that other compounds of the invention may be obtained by carrying out the Fries reaction or rearrangement with the products of Examples 14, 15 and 16 herein. For example, a charge of 0.05 mol of alpha-(p-acetoxybenzal)-butyrolactone is dissolved in 125 ml. of dry nitrobenzene. To this is added a charge of 0.15 mol of anhydrous aluminum chloride ($AlCl_3$) incrementally and the reaction mixture is heated for 3 hours in a boiling water bath. Next, 0.05 mol of dilute hydrochloric acid is added and the reaction mixture is refluxed for ½ hour. The nitrobenzene is removed by steam distillation and the resulting black product left in the flask is recrystallized from methanol several times using activated carbon in the first recrystallization. The resulting product is alpha-(3-acetyl-4-hydroxybenzal)-butyrolactone in the form of light tan crystals melting at 175.5–176.5° C. Elemental analysis for this product: calculated for $C_{13}H_{12}O_4$ is C=67.23, H=5.21; and found: C=67.19, H=5.26.

In a similar procedure, a charge of 0.03 mol of alpha-(orthoacetoxybenzal)-butyrolactone is dissolved in 100 ml. of dry nitrobenzene. With slight warming, a charge of 0.9 mol of anhydrous aluminum chloride is added, and the reaction mixture is then heated in a water bath at 77–80° C. for 5 to 6 hours. The reaction is terminated by refluxing the reaction mixture for ½ hour with 70 ml. of dilute hydrochloric acid. The nitrobenzene is removed by steam distillation; and after standing overnight, the precipitate formed is filtered off, recrystallized from methanol and finally recrystallized from ethylene dichloride to yield a product melting at 192–194° C. By oxidation of the product to the corresponding benzoic acid it is established that this product is alpha-(2-hydroxy-5-acetylbenzal)-butyrolactone. Elemental analysis for the product: calculated for $C_{13}H_{12}O_4$ is C=67.23, H=5.21; and found: C=67.21, H=5.30.

*Example 17*

A procedure is carried out that is the same as that of Example 14, except that the butyrolactone derivative used as a starting material is alpha-(3-methoxy-4-hydroxybenzal)-butyrolactone (Example 10 or Example 13) and the resulting product is alpha-(3-methoxy-4-acetoxybenzal)-butyrolactone melting at 151.5–152.5° C.

*Example 18*

The hydroxy group in the instant butyrolactone derivatives may also be replaced by the group —$O(CH_2)_nND_2$, wherein n is 1, 2 or 3 and D is a $C_1$–$C_4$ alkyl group. In such case the selected "hydroxy" butyrolactone derivative is reacted with such compounds as dimethylaminoethylchloride, diethylaminoethylchloride, diethylaminotrimethylenechloride, etc., in the presence of an organic base to assist in removal of the hydrochloric acid by-product. For example, a charge of 0.1 mol of alpha-(p-hydroxybenzal)-butyrolactone, 0.1 mol of dimethylaminoethylchloride, 2 mols of methanol and 0.1 mol of trimethylamine is refluxed for 2 hours and the resulting mixture is poured into an equal volume of water from which alpha-(p-diethylaminoethoxybenzal)-butyrolactone precipitates and is separated and dried. Using diethylaminoethylchloride in the foregoing reaction, the resulting product is alpha-(p-diethylaminoethoxybenzal)-butyrolactone in the form of white crystals melting at 79.5–80° C. Elemental analysis for this compound: calculated for $C_{17}H_{23}NO_3$ is C=70.56, H=8.01, N=4.84; and found: C=70.77, H=8.04, N=4.91. This compound exhibits a uterine sedative action of about 1/10 that of papaverine and exhibits antibacterial activity with respect to *Streptococcus pyogenes*. The corresponding hydrochloride of this compound prepared from methanol in the presence of concentrated hydrochloric acid, is alpha-(diethylaminoethoxybenzal)-butyrolactone hydrochloride which is a white amorphous material melting at 199–200° C. and the elemental analysis calculated for Cl is 10.88, found is 10.92.

Alpha-(o-diethylaminoethoxybenzal)-butyrolactone hydrochloride (prepared by employing the procedure just described starting with alpha-(o-hydroxybenzal)-butyrolactone) is a white crystalline material melting at 176° C.

*Example 19*

Corresponding butyrolactone derivatives of the invention may be obtained carrying out the procedure of Example 1, using instead of the aldehyde of Example 1, 5-nitrosalicylaldehyde, m-hydroxycinnamaldehyde, 2-hydroxy-4-chlorobenzaldehyde, 2-hydroxy-4-bromobenzaldehyde, and 3-methoxy-4-chlorobenzaldehyde. Other butyrolactone derivatives of the invention may be prepared using the foregoing procedure with 2-hydroxy-4-benzylbenzaldehyde and 2-methyl-4-hydroxybenzaldehyde.

*Example 20*

A charge of 0.05 mol of alpha-(2-hydroxy-5-nitrobenzal)-butyrolactone is added to 0.4 mol of stannous chloride dissolved in 225 ml. of HCl. Substantially the entire amount of the charge enters into solution, and after a few minutes moderately exothermic reaction occurs and the mixture solidifies. After 24 hours standing at room temperature, the precipitate is filtered by suction and immediately added to 300 ml. of concentrated aqueous ammonia and stirred for several hours at room temperature. The residue is filtered again, washed thoroughly with water and dried over $P_2O_5$ at 5 mm. Hg. The resulting material is alpha-(2-hydroxy-5-aminobenzal)-butyrolactone.

The resulting primary amino butyrolactone derivative can be converted to a secondary or tertiary amino derivative by reaction with a suitable alkyl chloride, such as methyl chloride, ethyl chloride, propyl chloride, butyl chloride, etc. For example, alpha-(2-hydroxy-5-ethylaminobenzal)-butyrolactone is prepared by refluxing a charge of 0.1 mol of alpha-(2-hydroxy-5-aminobenzal)-butyrolactone, 0.1 mol of ethyl chloride, 2 mols of methanol and 0.1 mol of trimethylamine for 2 hours and pouring the resulting reaction mixture into an equal volume of water, from which the product precipitates and is separated. Using 0.2 mol of ethyl chloride and of the dimethylamine, the resulting product is alpha-(2-hydroxy-4-N,N-diethylaminobenzal)-butyrolactone.

It will thus be noted that in the compound of the invention, AXR, the radical X is preferably an aliphatic hydrocarbon group such as:

=CH— (as in p-hydroxybenzaldehyde)
=CHCH$_2$— (as in p-hydroxyphenylacetaldehyde)
=CHCH$_2$CH$_2$— (as in p-hydroxyphenylpropionaldehyde)
=CHCH=CH— (as in 3,4-dihydroxycinnamaldehyde)
=CHCH$_2$CH$_2$CH$_2$— (as in p-hydroxyphenylbutyraldehyde)

Following the procedure of Example 1 using any of the aforementioned aldehydes, one obtains the corresponding condensation product.

It will further be noted that the radical R may contain from 1 to 3 nuclear substituents such as —D, —NO$_2$, —NHD, —ND$_2$, —COD, benzyl, halo and —OY. There must be at least one —OY substituent and there may be two or three —OY substituents. Preferably there is not more than one substituent from the group listed which is not —OY.

It will be understood that modifications and variations may be effected without departing from the spirit and scope of the novel concepts of the present invention.

We claim as our invention:

Alpha-(hydroxybenzal)-butyrolactone.

References Cited in the file of this patent

FOREIGN PATENTS 844,292    Germany _____ July 8, 1949

OTHER REFERENCES

Jacobs et al.: J. of Biol. Chem., vol. 93, pp. 139–152 (1931).

Jacobs: "Chem. Abst.," 26, 865 (1932).

Bergmann: "Chemistry of Acetylene and Related Compounds," pages 80–81, Interscience Pub. Inc., 1948.

Russel et al.: Biochemical Journal, vol. 45, pp. 530–537 (1949).

Fuson: "Advanced Organic Chemistry," pages 180–181 (1950), John Wiley and Sons.